May 7, 1940. T. A. TAYLOR ET AL 2,200,210
SAFETY DEVICE FOR ROTARY DRILLING RIGS
Filed Sept. 28, 1938 2 Sheets-Sheet 1
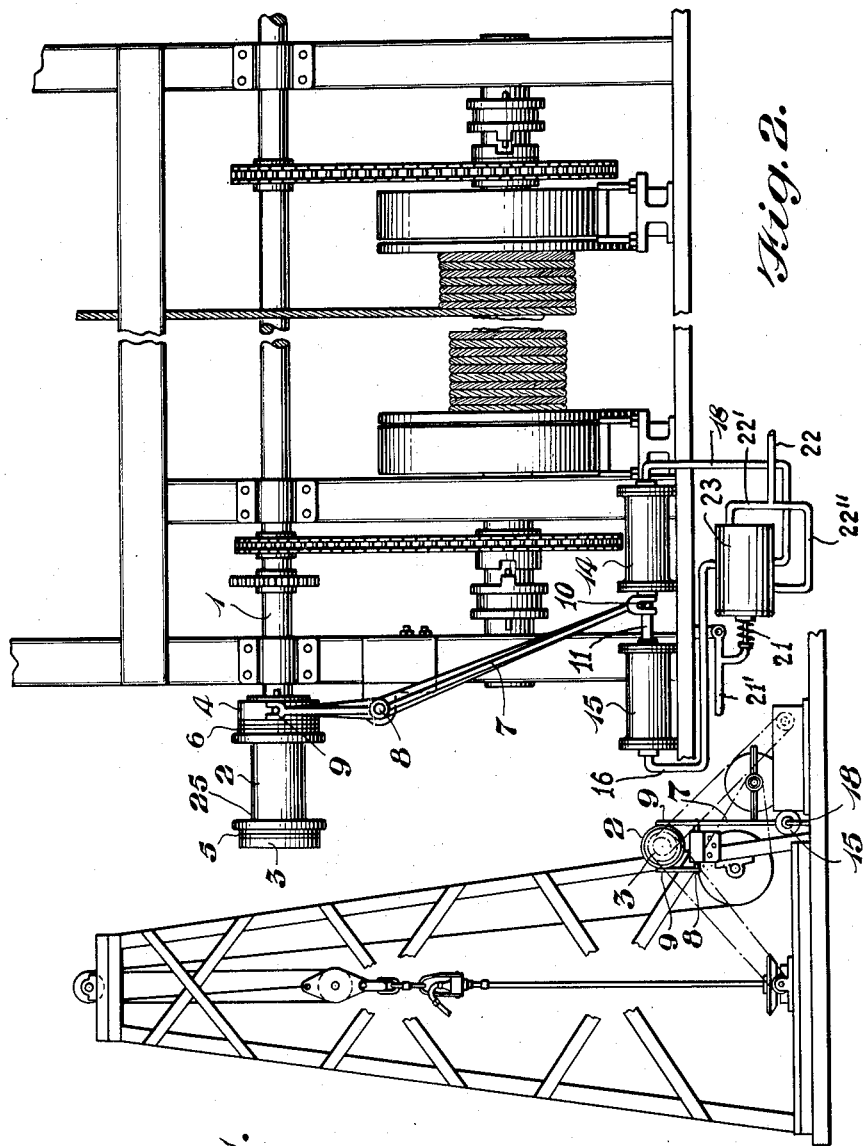
Inventors
T. A. Taylor and
C. F. McComas.
By C. W. Anderson & Son.
Attorney Patented May 7, 1940

2,200,210

UNITED STATES PATENT OFFICE 2,200,210

SAFETY DEVICE FOR ROTARY DRILLING RIGS

Tom A. Taylor and Charles F. McComas, Olney, Ill.

Application September 28, 1938, Serial No. 232,218

2 Claims. (Cl. 254—187)

The invention relates to draw works or rotary drilling rigs, wherein the line shaft is provided at one or both ends thereof with a power take-off or "cat head" pulley, it being customary to spin or draw up drill pipe and various other objects by coiling one end portion of a rope around said pulley and the attendant or "cat head" man pulling upon the loose end portion of the rope to keep the coil tight on the pulley and to take in the slack, the other end portion of the rope being connected to the drill pipe or other object to be drawn up, said line shaft having a clutch which is thrown in and out to drive and release the same.

Due to the fact that the attendant or "cat head" man is liable to become fouled in the rope which he is pulling, it is an object of the invention to provide a safety device for rendering the clutch so operative and inoperative that said pulley may be stopped instantly by the attendant the instant the rope is fouled, said stopping of the pulley being either voluntary or involuntary on the part of the man pulling the rope. Another object is to provide such a safety device adapted to be installed on any size or type of draw works or rotary drilling rig with little difficulty. Another object is to provide a simple and inexpensive device of this description. Other objects and advantages will appear hereinafter.

The invention consists in the novel construction and combinations of parts as hereinafter set forth in the claims.

Figure 3:
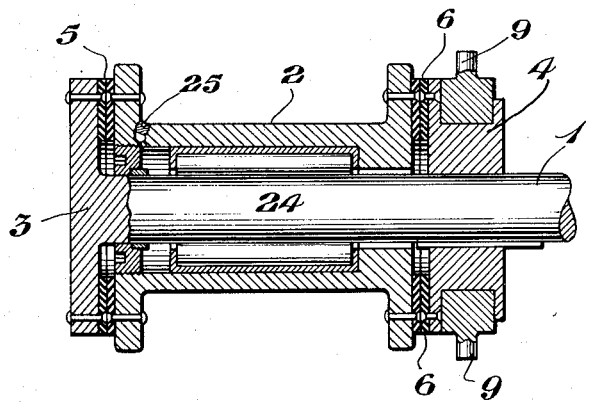
Figure 4:
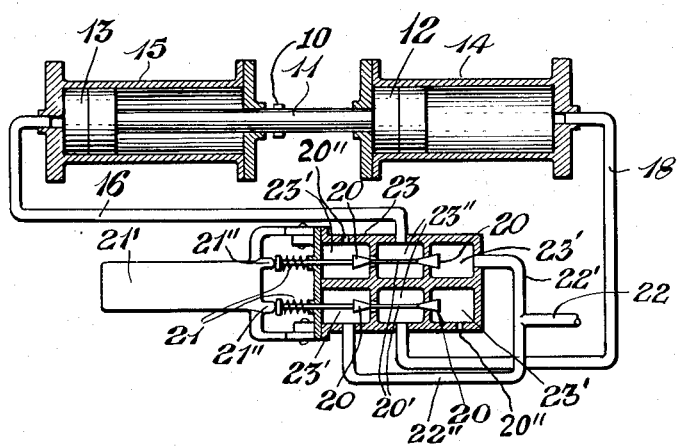

In the accompanying drawings,

Figure 1 is an end view of the invention as applied to a rotary drilling rig. Figure 2 is a side view of the same on a larger scale, with the treadle depressed to render the clutch operative, the connections of the pipes to the aligned cylinders being diagrammatic and parts being broken away. Figure 3 is a detail central longitudinal section of the power take-off pulley, showing the clutch and the collar. Figure 4 is a detail sectional view, partially diagrammatic, showing the aligned cylinders, the valve device, and the pipe connections, the treadle being shown as released to render the clutch inoperative.

In these drawings, the numeral 1 designates the line shaft of a draw works or rotary drilling rig, whereon is mounted a power-take-off or "cat head" pulley 2, one end portion of a rope being adapted to be coiled around said pulley and the loose end of the rope pulled by the attendant or "cat head" man as described.

The pulley 2 is loosely mounted on the line shaft, a collar 3 being fixedly mounted on an end of the line shaft adjacent said pulley and a clutch head 4 being fixedly mounted or keyed to the line shaft adjacent the other side or end of the pulley, a clutch lining 5 being interposed between said collar and the pulley and a clutch lining 6 being interposed between said clutch head and the pulley.

A lever 7, fulcrumed at 8 has the upper end thereof operatively connected or engaged with said clutch head at 9, and the lower end thereof operatively engaged at 10 with a rod 11, whereby upon movement of said rod in one direction or the opposite direction the clutch head will be moved to render the clutch operative or inoperative as the case may be, thereby setting the pulley in rotation with the line shaft or releasing the pulley from the shaft.

The rod 11 is a connecting rod between two pistons 12 and 13, said pistons working in aligned cylinders 14 and 15. A valve casing 23 is provided at each end thereof with two valve chambers 23' located at opposite sides of the casing, and with two central chambers 23" having ports communicating with said valve chambers. Working in said valve chambers and controlling said ports are four valves 20, each couple of valves being aligned and having a stem 20' connecting the same and having a retracting spring 21. A pipe 22 connected to a source of fluid pressure has a branch 22' communicating with a valve chamber at one end and one side of said casing and a branch 22" communicating with a valve chamber at the other end and other side of said casing. A pipe 16 connects a central chamber 23" at one side of said casing with the outer end of cylinder 15, and a pipe 18 connects the central chamber at the other side of the casing with the outer end of the cylinder 14.

A treadle control lever 21' has connection with the valve stems 20', and is adapted upon actuation to close the valve ports of the chambers at one end of said casing and open the valve ports of the chambers at the other end of said casing, thereby admitting fluid pressure to cylinder 15 to positively operate lever 7 in one direction and render the clutch operative. Upon release of the treadle control lever the valves 20 are retracted by their springs 21 to normal position to close the valve ports of the chambers at the other end of the casing and open the valve ports of the chambers at the opposite end of the casing, thereby admitting fluid pressure to cylinder 14 to positively operate lever 7 in the opposite direction and render the clutch inoperative, the fluid pressure in the cylinders having exhaust through ports 20"

of those of the valve chambers with which the branches of the pipe 22 have no connection.

The treadle control lever 21' is adapted to be depressed by the foot of the attendant pulling the end portion of the rope as aforesaid, and upon removal of his foot either voluntarily or involuntarily from said lever, the valves will be retracted by their springs to instantly render the clutch inoperative.

The clutch lining 5 is duplicated upon the collar and the pulley and the clutch lining 6 is duplicated upon the clutch head and the pulley, operation of lever 7 serving to frictionally engage and disengage the clutch linings to render the clutch operative or inoperative as the case may be.

The take-off pulley or "cat head" is provided with suitable anti-friction bearings 24, and a countersunk Alemite fitting 25 for applying lubricant to said bearings.

In practice it is found that the take-off pulley or "cat head" may be stopped instantly by the man pulling the rope the instant the rope is fouled by removal of his foot from the treadle control lever 21', and if he does not get his foot off the treadle control lever quick enough he will be pulled off the treadle by the rope, whereupon the pulley will be instantly stopped due to the clutch being rendered inoperative.

The clutch will be rendered operative and inoperative substantially instantaneously upon depression of the treadle 21' and release thereof, and the friction clutch described will pull all that a one and one-half inch diameter rope will stand, this being the largest rope for this purpose used upon a rotary rig. All parts described will operate well and efficiently.

We claim:

1. In a rotary drilling rig having a line shaft provided with a cat head pulley loosely mounted thereon, a normally inoperative clutch between said shaft and said pulley, and means for rendering said clutch operative and inoperative comprising a lever having engagement with a member of said clutch; the operating means for said lever being positive in both directions and including aligned cylinders, pistons working therein and having a rod connecting the same, said lever having engagement with said rod, and means for admitting fluid pressure to one of said cylinders to render said clutch normally inoperative and for admitting fluid pressure to the other cylinder to render said clutch operative comprising a valve device having spring retracted valves and a control lever for adjusting said valves against the tension of their springs, said valves being retracted by their springs to render the clutch inoperative upon voluntary or involuntary release of said control lever.

2. In a rotary drilling rig having a line shaft provided with a cat head pulley loosely mounted thereon, a normally inoperative clutch between said shaft and said pulley, and means for rendering said clutch operative and inoperative comprising a lever having engagement with a member of said clutch; the operating means for said lever being positive in both directions and including aligned cylinders, pistons working therein and having a rod connecting the same, said lever having engagement with said rod, and means for admitting fluid pressure to said cylinders including a valve casing provided at each end thereof with two valve chambers located at opposite sides of the casing, and with two central chambers having ports communicating with said valve chambers, four valves controlling said ports and located in said valve chambers, each couple of valves being aligned and having a stem connecting the same and provided with a retracting spring, the source of fluid pressure having a branch communicating with a valve chamber at one end and one side of said casing and a branch communicating with a valve chamber at the other end and other side of said casing, a pipe connecting a central chamber at one side of the casing with the outer end of one of said cylinders, a pipe connecting the central chamber at the other side of the casing with the outer end of the other of said cylinders, and a control lever having connection with the valve stems and adapted upon actuation to close the valve ports of the chambers at one end and open the valve ports of the chambers at the other end of said casing, said valves being retracted automatically upon release of said control lever.

T. A. TAYLOR.
C. F. McCOMAS.